United States Patent [19]

Thompson et al.

[11] Patent Number: 4,731,233
[45] Date of Patent: Mar. 15, 1988

[54] METHOD AND COMPOSITION FOR UTILIZING LIME-UREA HYDRATES TO SIMULTANEOUSLY REDUCE $NO_x$ AND $SO_x$ IN COMBUSTION EFFLUENTS

[76] Inventors: Richard E. Thompson, 27121 Puerta del Oro, Mission Viejo, Calif. 92691; Lawrence J. Muzio, 29541 Vista Plz., Laguna Niguel, Calif. 92677

[21] Appl. No.: 817,319

[22] Filed: Jan. 9, 1986

[51] Int. Cl.$^4$ .......................... B01J 8/00; C01B 17/00; C01B 21/00
[52] U.S. Cl. .................................... 423/231; 423/244; 423/243
[58] Field of Search ................ 423/239, 244, 235, 243

[56] References Cited

U.S. PATENT DOCUMENTS

| 4,208,386 | 6/1980 | Arand et al. | 423/239 |
| 4,325,924 | 4/1982 | Arand et al. | 423/235 |
| 4,424,197 | 1/1984 | Powell et al. | 423/244 A |
| 4,442,079 | 4/1984 | Donnelly et al. | 423/244 A |
| 4,442,080 | 4/1984 | Donnelly et al. | 423/244 A |
| 4,526,703 | 7/1985 | Gebhard et al. | 423/244 R |
| 4,533,532 | 8/1985 | Gebhard et al. | 423/244 R |

FOREIGN PATENT DOCUMENTS 0090168 8/1978 Japan ................................... 423/239

Primary Examiner—Gregory A. Heller
Assistant Examiner—Lori S. Freeman
Attorney, Agent, or Firm—Bertram I. Rowland

[57] ABSTRACT

Methods and compositions are provided for simultaneous reduction of $NO_x$ and $SO_x$ in combustion effluents and process gas streams, employing a sorbent material of calcium or dolomitic lime hydrated with aqueous carboxamides, optionally with carbinol reductants, in amounts sufficient to reduce the $NO_x$ and $SO_x$ concentrations from the effluents. The sorbent material may be introduced as dry powders or wet hydrates in effluent streams at temperatures ranging from 400° to 2400° F.

13 Claims, No Drawings

METHOD AND COMPOSITION FOR UTILIZING LIME-UREA HYDRATES TO SIMULTANEOUSLY REDUCE NO$_x$ AND SO$_x$ IN COMBUSTION EFFLUENTS

BACKGROUND OF THE INVENTION

1. Field of the Invention

The burning of fossil fuels, for example in a utility power plant boiler, produces combustion effluents that include undesirable sulfur and nitrogen compounds, primarily nitric oxide (NO) and sulfur dioxide (SO$_2$). Combustion processes are known to produce other environmental contaminants such as unburned hydrocarbons and carbon monoxide which are also released in the flue gas in various concentrations. The nitric oxide is oxidized in the atmosphere to nitrogen dioxide, which subsequently reacts with hydrocarbons in the presence of sunlight to form photochemical "smog". Prior research has shown that emissions of sulfur dioxide into the atmosphere can combine with rainwater to produce acidic deposition or "acid rain" which damages lakes, streams, fish populations and forest preserves. Recent environmental research, particularly in West Germany, concerning atmospheric transport, chemistry and deposition associated with "acid rain" suggests that substantial forest damage is also caused by nitrogen oxides. Prior human health effects research in Tennessee has been cited by the U.S. EPA as justification for emission standards to control nitrogen oxides produced by combustion processes.

Combustion products from automotive internal combustion engines, fossil fuel power plants, process furnaces, incinerators and the like all contribute to the production of nitric oxide. Control of nitric oxide production has been directed toward modifications in the combustion process or removal of the nitric oxide from the combustion products prior to discharge into the atmosphere. Examples of these control measures were discussed at the EPA/EPRI Joint Symposia on stationary combustion NO$_x$ control held in Dallas, Tex. in 1983 and Boston, Mass. in May, 1985.

There have been numerous efforts to effectively remove nitric oxide from combustion effluents. One of the major difficulties has been that many of these devices only operate well with relatively large oxygen excess. This is true of power plant boilers, process furnaces, gas turbines, diesels, stratified charge engines, and spark ignition engines with thermal reactors. These devices generally contain flue gases with oxygen concentrations from 0.1 to 10 volume percent and nitric oxide concentrations from 100 to 4000 ppm. Thus, oxygen is present in large excess with respect to nitric oxide. While it is well known how to reduce both nitric oxide and oxygen with large quantities of a reducing agent, desirably, a process should reduce nitric oxide selectively.

Effluents from the combustion processes named previously may contain substantial concentrations of sulfur dioxide in proportion to the sulfur in the fuel. Since coal is an economically attractive fuel in the U.S. for large fuel consumers including electrical utility boilers, there have been numerous processes developed to control sulfur emissions including wet scrubbers, spray dryers, fluidized bed combustor, and in-furnace sorbent injection processes (also known as LIMB). One of the most prevalent methods of removing SO$_2$ from combustion effluents has been the wet scrubber. However, utilities have expressed disappointment with wet scrubbers in terms of power consumption, capital cost, frequent failures, corrosion, etc. A dry SO$_2$ removal process is frequently preferred where the spent sulfur capture material can be collected and removed along with the fly ash. Fluidized bed combustion systems show promise as an alternative for new power plants, but retrofit applications are very costly. Current research and development efforts for retrofit applications have been directed at in-furnace sorbent injection processes leading to dry SO$_2$ removal as discussed at the recent EPRI/EPA First Joint Symposium on Dry SO$_2$ Control Technologies in San Diego, Calif. in November, 1984.

One of the primary limitations of most current NO$_x$ and SO$_x$ control technologies is that they require separate costly equipment and process control measures that occasionally degrade plant performance and reliability. Therefore, there is an important need for a simultaneous NO$_x$ and SO$_x$ control technology that utilizes only one set of equipment and preferably is a dry process that requires little or no equipment in direct contact with the combustion effluent stream.

Efforts have been made to avoid the problems of wet scrubbing SO$_2$ control systems wherein the gas contacts a finely divided SO$_2$ sorbent material that has been dried to a powder by the heat of the flue gas stream. These systems have posed some problems, but importantly, the commonly used sorbent materials have no ability to also reduce NO$_x$ emissions. Therefore, a separate NO$_x$ control system is required. Fluidized bed systems have been developed for SO$_2$ control, but desulfurization efficiency is low if the bed is operated at temperatures to minimize NO$_x$ emissions and their NO$_x$ control efficiency is poor when optimized for cost effective sulfur capture. In addition, development problems exist with heat removal from the bed without coolant tube burnout. Also, most systems require the spent reactants to be regenerated or subject to conversion treatment to obtain useable by-products. For these reasons, utility and environmental research organizations have expressed a need for simultaneously removing NO$_x$ and SO$_x$ from a combustion effluent stream with a dry process that can be retrofit to an existing boiler without requiring major lower furnace modifications with a fluid bed or large space consuming wet scrubbers at the stack. It is also preferable to have a dry spent reactant material that can be collected by a conventional existing precipitator or baghouse.

DESCRIPTION OF THE RELEVANT LITERATURE

In U.S. Pat. No. 4,208,386 there is disclosed a method for reducing NO$_x$ in combustion effluents by contacting urea with combustion effluents containing oxygen and oxides of nitrogen an elevated temperature. The urea is claimed to selectively reduce the oxides of nitrogen.

In U.S. Pat. No. 3,900,554 there is disclosed a method for the use of ammonia for selectively reducing nitric oxide. This method employs a thermal homogeneous gas phase method of selectively reducing NO in the presence of O$_2$ and does not require the use of an associated solid catalyst.

In U.S. Pat. No. 3,565,575 there is disclosed a process for scrubbing nitrogen oxides from a nitric acid plant using an aqueous urea solution. In this process the nitrogen oxides are first dissolved in the solution to form nitrous acid which reacts with the urea to form nitrogen, carbon dioxide and water.

In U.S. Pat. No. 4,388,877 there is disclosed a method and composition for carrying out the combustion of fossil fuels in a fluidized bed with reduced emissions of sulfur, carbon and nitrogen oxides, and unburned hydrocarbons. The capture of sulfur and nitrogen oxides occurs within the bed material where combustion simultaneously occurs. Calcium carbonate, dolomites and calcium oxides are used as sorbents, and the sorbent is combined with catalytic metal substances that are impregnated onto the matrix.

In U.S. Pat. No. 4,424,197 a process is disclosed for adsorbing sulfur dioxide from flue gas by using stoichiometric amounts of a specially prepared calcium oxide material. High lime utilization is achieved by flash calcining sand-size grains of calcium carbonate which results in calcium oxide particles comprising a highly voided skeletal structure of very large surface area and large pore volume.

SUMMARY OF THE INVENTION

Sulfur oxide and nitrogen oxide streams are treated with a sorbent material from lime (high calcium or dolomitic) hydrated with aqueous amides, particularly carbonic acid amides, optionally in combination with organic reductants, contact of the stream at elevated temperatures in the presence of oxygen results in the substantial reduction of sulfur and nitrogen oxide concentrations in the gas stream.

Sorbent materials may be prepared by hydrating high calcium lime or dolomitic lime with aqueous carboxamide solutions, particularly urea solutions, in appropriate ratios based on the relative concentrations of nitrogen and sulfur oxides in the effluent stream. Other additives may be included in the hydrating solution. The sorbent material is introduced into the effluent stream at temperatures in the range of about 400° to 2400° F., where the presence of ancillary reductants or catalytic substances in the hydration process or added in combination with the sorbent material permits operations in the lower portion of the temperature range. Dry spent reactant may be collected along with substantially inert $CaSO_x$ products, while $NO_x$ results in nitrogen formation.

This includes effluents from utility power plant boilers, industrial and commercial boilers, process furnaces, MHD combustors, stationary and mobile gas turbine engines, stationary and mobile spark ignited and diesel engines, incinerators, and any combination thereof, such as supplementary-fired combined cycle power plants. The industrial waste gas effluent or process gas stream may be from any process that includes both nitric oxide and sulfur dioxide in the gas stream. This includes smelters, ore roasters, waste treatment processors or incinerators; and coal, peat, shale, tar sand, coke, petroleum crude, or natural gas processing. Fuel treatment, gasification, desulfurization or processing to produce synthetic liquids or solids derived from other fuels are also included.

DESCRIPTION OF THE SPECIFIC EMBODIMENTS

The subject invention provides for methods and compositions for efficiently and economically simultaneously reducing sulfur and nitrogen oxides in gaseous streams. The compositions employed are hydrated limes, either high calcium (slaked lime) or dolomitic lime, which are hydrated with an aqueous medium containing at least one carboxamide and optionally other materials which may be involved in the process for reducing the amount of sulfur and nitrogen oxides. The method finds particular use in combustion effluents and industrial waste gas effluents or process gas streams. The products are usually inert with calcium sulfate and sulfite being collectible and nitrogen being an innocuous gas.

While the method will find use primarily with effluents from fossil fuel combustion, the method may also find use in waste processing, metal processing and the process chemical industry, where gas streams result in elevated temperatures containing both nitrogen and sulfur oxides. For example, effluents streams from smelters, ore roasters, hazardous waste incinerators, coal gasification, crude processing and coal or oil desulfurization processes frequently require the control or reduction of both $NO_x$ and $SO_x$.

The sorbent material will be introduced into the gas stream, where the gas stream is at a temperature of at least about 400° F. and preferably at least about 1300° F., more preferably about 1600° F. and generally not exceeding about 2400° F., usually not exceeding about 1900° F. In the lower region of the temperature range, usually other additives will be present for enhancing removal of nitrogen and sulfur oxides.

Additives which may be employed include catalysts, such as titanium dioxide and vanadium pentoxide on aluminum support, which aids in the removal of the nitrogen oxides. In the middle region of the temperature range, e.g., about 1300° F., an ancillary organic reductant, particularly a polyol, e.g., a carbohydrate, may be present as part of the sorbent material or added concurrently. The polyol should be oxidizable at temperatures of less than about 1500° F. and will for the most part be carbohydrates of from 6 to 12 carbon atoms, particularly fructose, glucose and sucrose.

The effluent should have at least 0.1 volume percent oxygen and not more than about 20 volume percent oxygen, preferably having from about 0.1-10 volume percent oxygen. The pressure in which the removal process is carried out is not critical and may be varied widely. Generally, the pressure will be from about 0.1 to 100 atm. The residence time for the reaction will generally range from about 0.001 to 10 sec. The material which is injected into the stream may be injected dry as a fine powder, slurried as a fine spray or molten as a fine spray. Various techniques can be employed for introducing the sorbent material. These techniques include high pressure nozzles, pneumatic gas injection, either air or combustion product gas, rotary atomizers, etc.

The sorbent material may be introduced into the effluent stream in finely divided form as a dry powder or aqueous slurry droplets. The sorbent is injected into the effluent stream so as to provide a substantially uniform distribution of the material in the effluent stream.

The sorbent material may be introduced at various sites along the path of the effluent stream, preferably in the boiler. Streams which are encountered will generally have from about 300 to 5000 ppm of $SO_2$ and about 100 to 1500 ppm of $NO_x$, depending upon the source of the effluent stream, for example, the source of the fuel, and the conditions under which the effluent stream is formed. The sorbent particles will generally be of a size in the range of about $0.5\mu$ to $20\mu$, more usually $1\mu$ to $10\mu$, where the wet sorbent drop sizes of the slurry will usually be from about $10\mu$ to $750\mu$, while the dry sorbent particles will usually be from about 20μ to 250μ. The surface area will usually be from about 10 to 50, usually 20 to 40 m²/g. The droplets will usually have less than 50 weight percent, usually less than about 20 weight percent free (uncomplexed) water. The amount of sorbent material will provide from about 5 to 95% reduction of $SO_x$ and from about 5–80 mol. percent of $NO_x$.

The hydrating material is formed by dissolving the carboxamide compound in water or aqueous solution, where other materials may be present. Various carboxamide materials may be employed, such as urea, uric acid, semicarbazide, formamide, etc., particularly those compounds composed solely of nitrogen, hydrogen, carbon and oxygen, where the nitrogen is bonded to at least 1 hydrogen, usually at least 2 hydrogens and carbon is bonded solely to nitrogen and oxygen. To the aqueous medium is added the high calcium, magnesium, dolomitic or hydraulic quicklime. The reactants react to form the sorbent compound. The proportion of water to lime depends on whether a dry powdered hydrate or aqueous (slaked) form is desired. Assuming complete hydration of 100% pure quicklime (CaO), the water of hydration is 24.3% for high calcium and 27.2% for true dolomite where the values of magnesium lime are intermediate, depending on the MgO content. Practically, an excess of moisture over the theoretical amount is required to achieve complete hydration since some water will be lost through evaporation brought by on the heat of hydration. The slurry preparation contains about 68–73% free water. The hydration may occur at ambient conditions or at elevated pressures up to 300 psia. Typically, high calcium lime will be hydrated at atmospheric pressure, while elevated pressures are preferred for the dolomitic materials. The hydration temperature will generally range from about 33° to 270° F., the upper limit being controlled by the stability of the amide compound. The uncomplexed water may be removed to provide "dry" particles substantially free of uncomplexed water.

The amount of amide used during the hydration process can be tailored to the $SO_x$ and $NO_x$ concentrations in the combustion effluent and the desired level of $SO_x$ and $NO_x$ removal. Typically, the injection of $SO_x$ neutralizing capability will be at a rate such that the Ca/S or (Ca+Mg/S) molar ratio is in the range of 0.1–5, preferably 1–3. The amount of urea in the hydration solution should be such that the molar ratio of urea to $NO_x$ is in the range of 0.01–10, preferably 0.5–2. For example, a boiler firing an eastern high sulfur bituminous coal will exhibit $SO_2$ and $NO_x$ concentrations in the combustion products of the order of 3000 ppm $SO_2$ and 800 ppm $NO_x$. If the $SO_2/NO_x$ sorbent is to have a Ca/S molar ratio of 2 and a urea/$NO_x$ ratio of one half, then the hydration of a high calcium CaO lime should include 0.071 g of urea per gram of CaO. Other ratios can be determined using the same methodology.

The weight ratio of lime to carboxamide will vary widely depending upon the type of lime, the composition of the carboxamide, the composition of the effluent stream to be treated, and the like. Generally the weight ratio will be from about 2–25:1 to about 5–20:1.

In addition, other additives may be used during the hydration process. These can be classified as additives that (1) change the physical properties of the resulting hydrated sorbent material or (2) change the physical properties and remain present in the final hydrated material. Examples of the first class include materials that have boiling temperatures less than that of water (i.e., 212° F. at 14.7 psia) such as the alkanols of 1–2 carbon atoms, i.e., ethanol or methanol. Examples of the second include sugars such as sucrose and fructose, calcium acetate, NaCl, and $CaCl_2$. The polyols, e.g., sugars, will be present in from about 0.1 to 5 parts per part of lime. Additives containing carbon and hydrogen that remain in the hydrated materials extend the temperature range of the process below 1500° F.

The following examples are offered by way of illustration and not by way of limitation.

EXPERIMENTAL

EXAMPLE 1

A known amount of calcium oxide (CaO) was hydrated with a water solution containing known amounts of urea ($NH_2$—CO—$NH_2$). The resulting dry powdered $SO_2/NO_x$ sorbent containing both $Ca(OH)_2$ and $NH_2$—CO—$NH_2$ was injected into combustion products containing $SO_2$ and $NO_x$.

The combustion products were generated by burning known amounts of natural gas and air in a 6" diameter combustion tunnel. The $SO_2$ at the point where the sorbent was injected was controlled by adding $SO_2$ to the natural gas. The nitric oxide at the point of sorbent injection was controlled by adding $NH_3$ to the natural gas, a portion of which is converted to nitric oxide during combustion of the natural gas. The temperature at the point of sorbent injection was measured by a thermocouple and controlled by (1) water cooled heat exchanger tubes upstream of the point of sorbent injection and (2) the amount of natural gas burned. The amount of oxygen in the combustion products was controlled by varying the relative amounts of natural gas and air. The sorbent was contacted with the stream of combustion products by using a screw feeder to add the sorbent to an air stream. The resulting sorbent air stream was then injected into the stream of combustion products. The change in $SO_2$ and nitric oxide was measured with continuous gas analysers. The following Table 1 indicates the results.

TABLE 1

| Test Group | Test No. | Hydrated Sorbent | | Combustor Conditions | | | Sorbent Injection Ratios | | Input | | Output | | Removal | |
|---|---|---|---|---|---|---|---|---|---|---|---|---|---|---|
| | | CaO gm | H₂O/urea sol. gm/gm | T °C. | Residence Time sec. | O₂ vol % (dry) | Ca/SO₂ mol ratio | Urea/NO mol ratio | SO₂ ppm (dry) | NO ppm (dry) | SO₂ ppm (dry) | NO ppm (dry) | ΔSO₂ % | ΔNOx % |
| 1 | 1 | 100 | 65/0 | 935 | 0.38 | 9.8 | 2.34 | 0 | 2390 | 487 | 1697 | 487 | 29 | 0 |
| | 2 | 100 | 65/5.25 | 937 | 0.38 | 9.8 | 2.41 | 0.49 | 2360 | 480 | 1676 | 230 | 29 | 52 |
| | 3 | 100 | 65/5.25 | 938 | 0.39 | 9.2 | 2.56 | 0.49 | 2400 | 520 | 1632 | 250 | 32 | 52 |
| 2 | 4 | 100 | 65/5.25 | 865 | 0.42 | 11.6 | 2.17 | 0.51 | 2400 | 485 | 1680 | 373 | 30 | 23 |
| | 5 | 100 | 65/5.25 | 915 | 0.40 | 10.6 | 2.21 | 0.43 | 2375 | 505 | 1758 | 313 | 26 | 38 |
| | 2 | 100 | 65/5.25 | 937 | 0.38 | 9.8 | 2.41 | 0.49 | 2360 | 480 | 1676 | 230 | 29 | 52 |
| | 6 | 100 | 65/5.25 | 970 | 0.38 | 9.5 | 2.27 | 0.44 | 2375 | 515 | 1734 | 273 | 27 | 47 |
| | 7 | 100 | 65/5.25 | 1020 | 0.37 | 7.8 | 2.36 | 0.45 | 2350 | 520 | 1669 | 270 | 29 | 48 |
| | 8 | 100 | 65/5.25 | 1107 | 0.35 | 7.8 | 2.34 | 0.44 | 2350 | 520 | 1550 | 390 | 34 | 25 |

TABLE 1-continued

| Test Group | Test No. | Hydrated Sorbent CaO gm | Hydrated Sorbent H$_2$O/urea sol. gm/gm | Combustor Conditions T °C. | Combustor Conditions Residence Time sec. | Combustor Conditions O$_2$ vol % (dry) | Sorbent Injection Ratios Ca/SO$_2$ mol ratio | Sorbent Injection Ratios Urea/NO mol ratio | Input SO$_2$ ppm (dry) | Input NO ppm (dry) | Output SO$_2$ ppm (dry) | Output NO ppm (dry) | Removal ΔSO$_2$ % | Removal ΔNOx % |
|---|---|---|---|---|---|---|---|---|---|---|---|---|---|---|
| 3 | 6 | 100 | 65/5.25 | 970 | 0.38 | 9.5 | 2.27 | 0.44 | 2375 | 515 | 1734 | 273 | 27 | 47 |
|   | 7 | 100 | 65/10.5 | 973 | 0.38 | 8.7 | 2.12 | 0.47 | 2340 | 980 | 1825 | 441 | 22 | 55 |
|   | 8 | 100 | 65/10.5 | 960 | 0.38 | 9.1 | 2.13 | 0.89 | 2400 | 535 | 1752 | 150 | 27 | 72 |

The data in test Group 1 of Table 1 demonstrate that hydrating CaO with a solution of H$_2$O and urea results in simultaneous SO$_2$ and NO removal when injected into a stream of combustion products containing SO$_2$ and NO. Furthermore, the data in Group 1 (Table 1) demonstrate that the presence of the urea in the resulting hydrated compound does not detrimentally affect the reaction between CaO and SO$_2$.

In the next study, the same equipment described above was used to demonstrate the effect of temperature within the preferred range of 800° C. to 1300° C., Table 1, Test Group 2. These data demonstrate that nitric oxide removal is maximum at a temperature between 915° C. to 1020° C. and that SO$_2$ removal does not vary to any large degree over this temperature range.

Following the test procedures already described, CaO was hydrated with a water-urea solution containing urea at a concentration twice as great as used in the previous tests. The resulting SO$_x$/NO$_x$ sorbent was injected into the combustion product stream containing SO$_2$ and NO. The results of these tests are shown in Table 1 as Test Group 3. These data demonstrate that (1) the level of nitric oxide removal can be adjusted relative to the SO$_2$ removal by changing the concentration of urea in the hydrating solution, and (2) the SO$_x$/NO$_x$ sorbent can be altered to accommodate varying SO$_2$ and NO concentrations by changing the concentration of urea in the hydrating solution.

EXAMPLE 2

A known amount of calcium oxide (CaO) was hydrated with a water solution containing known amounts of urea (NH$_2$—CO—NH$_2$) and sugar (sucrose, C$_{12}$H$_{22}$O$_{11}$). The resulting dry powder was injected into combustion products containing SO$_2$ and NO$_x$ using the procedure described in Example 1. The following Table 2 indicates the results.

TABLE 2

| Test No. | Hydrated Sorbent CaO gm | Hydrated Sorbent H$_2$O/urea/sugar gm/gm/gm | Combustor Conditions T °C. | Combustor Conditions Residence Time sec. | Combustor Conditions O$_2$ vol % dry | Sorbent Injection Ratios Ca/SO$_2$ mol ratio | Sorbent Injection Ratios Urea/NO mol ratio | Input SO$_2$ ppm (dry) | Input NO ppm (dry) | Output SO$_2$ ppm (dry) | Output NO ppm (dry) | Removal ΔSO$_2$ % | Removal ΔNOx % |
|---|---|---|---|---|---|---|---|---|---|---|---|---|---|
| 4 | 100 | 65/5.25/0 | 865 | 0.42 | 11.6 | 2.17 | 0.51 | 2400 | 485 | 1680 | 373 | 30 | 23 |
| 3 | 100 | 65/5.25/0 | 938 | 0.39 | 9.2 | 2.56 | 0.49 | 2400 | 520 | 1632 | 250 | 32 | 52 |
| 9 | 100 | 65/5.25/5.0 | 856 | 0.42 | 11.3 | 2.12 | 0.50 | 2330 | 505 | 1584 | 333 | 32 | 34 |
| 10 | 100 | 65/5.25/5.0 | 940 | 0.39 | 9.9 | 2.02 | 0.49 | 2410 | 510 | 1591 | 321 | 34 | 37 |

The data in Table 2 demonstrate that the optimum temperature at which NO is removed by the hydrated SO$_x$/NO$_x$ sorbent can be reduced by the addition of a soluble organic material to the hydrating solution. The organic material being such that it will be incorporated with the sorbent during the hydration process.

EXAMPLE 3

A known amount of calcium (CaO) was hydrated with a water solution containing known amounts of urea and ethanol. The resulting dry powder was injected into combustion products containing SO$_2$ and NO$_x$ using the procedures described in Example 1. The following Table 3 indicates the results.

TABLE 3

| Test No. | Hydrated Sorbent CaO gm | Hydrated Sorbent H$_2$O/urea/ethanol gm/gm/gm | Combustor Conditions T °C. | Combustor Conditions Residence Time sec. | Combustor Conditions O$_2$ vol % (dry) | Sorbent Injection Ratios Ca/SO$_2$ mol ratio | Sorbent Injection Ratios Urea/NO mol ratio | Input SO$_2$ ppm (dry) | Input NO ppm (dry) | Output SO$_2$ ppm (dry) | Output NO ppm (dry) | Removal ΔSO$_2$ % | Removal ΔNOx % |
|---|---|---|---|---|---|---|---|---|---|---|---|---|---|
| 1 | 100 | 65/0/0 | 935 | 0.38 | 9.8 | 2.34 | 0 | 2370 | 487 | 1697 | 487 | 29 | 0 |
| 11 | 100 | 62/0/8 | 937 | 0.40 | 9.9 | 2.32 | 0 | 2400 | 520 | 1752 | 520 | 27 | 0 |
| 3 | 100 | 65/5.25/0 | 938 | 0.39 | 9.2 | 2.56 | 0.49 | 2400 | 520 | 1632 | 250 | 32 | 52 |
| 12 | 100 | 62/5.25/8 | 940 | 0.40 | 9.8 | 2.18 | 0.47 | 2350 | 515 | 1716 | 314 | 27 | 39 |

The results in Table 3 demonstrate that urea can be added to a hydrating solution containing other solvents, such as ethanol, and that the resulting powdered sorbent will simultaneously remove SO$_2$ and NO when injected into a combustion product stream containing SO$_2$ and NO.

The subject invention provides a number of advantages in employing a solid sorbent for combined SO$_x$/NO$_x$ removal. The novel hydrated material is easily adjusted during manufacture to accommodate various ratios of SO$_x$ to NO$_x$. Only a single sorbent needs to be stored and injected into a combustion product stream for both SO$_x$ and NO$_x$ removal. Incorporation of the NO$_x$ reductant into the calcium matrix yields a sorbent which can be safely handled compared to other NO$_x$ reactants such as ammonia.

Although the foregoing invention has been described in some detail by way of illustration and example for purposes of clarity of understanding, it will be obvious that certain changes and modifications may be practiced within the scope of the appended claims.

What is claimed is:

1. A method for simultaneously reducing sulfur and nitrogen oxides from a gaseous oxygen containing stream at a temperature of at least about 400° F., said method comprising:

introducing into said stream at a predetermined ratio as a sorbent for the sulfur and nitrogen oxides, a composition comprising hydrated lime and a carboxamide in an amount sufficient to reduce the sulfur and nitrogen oxides in said effluent stream, wherein said composition is prepared by hydrating lime in an aqueous medium containing said carboxamide and removing uncomplexed water to provide dry particles, and wherein said predetermined ratio is in an amount to provide a calcium to sulfur molar ratio of about 0.1 to 10 and carboxamide amino nitrogen to $NO_x$ equivalent ratio in the range of about 0.2 to 20.

2. A method according to claim 1, wherein said lime is quicklime.

3. A method aooording to claim 2, wherein said lime is dolomitic lime.

4. A method according to any of claims 1, 2 or 3, wherein said carboxamide is urea.

5. A method according to claim 1, wherein said particles are introduced as an aqueous slurry.

6. A method for simultaneously reducing sulfur and nitrogen oxides from a gaseous oxygen containing stream at a temperature of at least about 1300° F. and having a volume percent oxygen of at least about 0.1, said method comprising:

introducing into said stream a sorbent composition comprising hydrated lime and carbonic acid amide, wherein said hydrated lime is formed by hydrating lime with an aqueous medium containing said carbonic acid amide, and removing uncomplexed water to provide dry particles of a size in the range of about 20 to 250 microns, in an amount to provide a calcium to sulfur molar ratio of about 0.1 to 10 and carbonic acid amide amino nitrogen to $NO_x$ equivalent ratio in the range of about 0.2 to 20.

7. A method according to claim 6, wherein said lime is quicklime.

8. A method according to claim 6, wherein said lime is dolomitic lime.

9. A method according to claim 6, wherein said carbonic acid amide is urea.

10. A method according to claim 6, wherein said aqueous medium has up to about 80% of an alkanol of from 1 to 2 carbon atoms.

11. A method according to claim 6, wherein said sorbent composition is particles substantially free of uncomplexed water as an aqueous slurry.

12. A method according to claim 6, wherein said sorbent composition is droplets containing up to about 20% water.

13. A method for simultaneously reducing sulfur and nitrogen oxides from a gaseous oxygen containing stream at a temperature of at least about 1300° F. and having at least about 0.1 volume percent oxygen, said method comprising:

introducing into the effluent stream from a boiler particles of a size in the range of about 0.5 to 20µ of a sorbent composition comprising hydrated lime or dolomitic lime and urea formed by hydrating quicklime or dolomitic lime in an aqueous medium containing said urea at an elevated temperature in the range of about 33° to 270° F., whereby said quicklime or dolomitic lime is substantially completely hydrated, and substantially removing uncomplexed water to provide dry particles, wherein the atomic ratio of calcium to sulfur as sulfur dioxide in said stream is from about 0.1 to 10 and the equivalent ratio of urea amino nitrogen to $NO_x$ is about 0.2 to 20.

* * * * *